United States Patent
Hayes

(10) Patent No.: US 10,093,590 B2
(45) Date of Patent: Oct. 9, 2018

(54) METHODS FOR TREATING SOLID FERTILIZER

(71) Applicant: AgXplore International, Parma, MO (US)

(72) Inventor: Paul Hayes, Parma, MO (US)

(73) Assignee: AgXplore International, LLC, Parma, MO (US)

( * ) Notice: Subject to any disclaimer, the term of this patent is extended or adjusted under 35 U.S.C. 154(b) by 126 days.

(21) Appl. No.: 15/116,180

(22) PCT Filed: Nov. 14, 2014

(86) PCT No.: PCT/US2014/065731
§ 371 (c)(1),
(2) Date: Aug. 2, 2016

(87) PCT Pub. No.: WO2015/116301
PCT Pub. Date: Aug. 6, 2015

(65) Prior Publication Data
US 2016/0340267 A1    Nov. 24, 2016

Related U.S. Application Data

(60) Provisional application No. 61/935,299, filed on Feb. 3, 2014.

(51) Int. Cl.
| | | |
|---|---|---|
| C05G 3/00 | (2006.01) |
| C05C 9/00 | (2006.01) |
| C05C 3/00 | (2006.01) |
| C05B 7/00 | (2006.01) |
| C05D 3/02 | (2006.01) |
| C05B 3/00 | (2006.01) |
| C05D 1/00 | (2006.01) |
| C05D 5/00 | (2006.01) |

(52) U.S. Cl.
CPC .............. *C05G 3/0041* (2013.01); *C05B 3/00* (2013.01); *C05B 7/00* (2013.01); *C05C 3/005* (2013.01); *C05C 9/005* (2013.01); *C05D 1/005* (2013.01); *C05D 3/02* (2013.01); *C05D 5/00* (2013.01); *C05G 3/0088* (2013.01)

(58) Field of Classification Search
None
See application file for complete search history.

(56) References Cited

U.S. PATENT DOCUMENTS

| | | | |
|---|---|---|---|
| 9,732,008 B2 * | 8/2017 | McKnight ............ | C05G 3/0041 |
| 2012/0312059 A1 * | 12/2012 | Killick ..................... | C05D 9/02 |
| | | | 71/23 |
| 2013/0145806 A1 * | 6/2013 | Iannotta .................... | C05G 3/08 |
| | | | 71/27 |
| 2014/0174140 A1 * | 6/2014 | Ortiz-Suarez ............ | C05G 3/08 |
| | | | 71/27 |
| 2018/0016200 A1 * | 1/2018 | Gabrielson ............... | C05G 3/08 |

* cited by examiner

*Primary Examiner* — Wayne A Langel
(74) *Attorney, Agent, or Firm* — Maxwell J. Petersen; Lewis Brisbois Bisgaard & Smith

(57) ABSTRACT

The present disclosure provides a method for treating a solid fertilizer. The method comprises contacting the solid fertilizer with an amount of a liquid composition effective for reducing clumping in the fertilizer caused by absorption of water. The liquid composition may comprise one or more organic solvents and/or petroleum distillates. The organic solvents may be selected from the group consisting of glycol, dialkylcarbonate, $C_1$-$C_4$ alcohol, vegetable oil, esters of hydroxyacids, heterocyclic alcohols, cyclic esters of carbonic acid, and esters of dicarboxyacids.

16 Claims, No Drawings

METHODS FOR TREATING SOLID FERTILIZER

CROSS-REFERENCE

The present application claims the benefit of the filing date under 35 § U.S.C. 119 of U.S. Provisional Patent Application Ser. No. 61/935,299, entitled "Methods for Treating. Granular Solid Fertilizer," filed Feb. 3, 2014, the disclosure of which is incorporated herein by reference in its entirety.

TECHNICAL FIELD

The present application generally relates to methods for a treating solid fertilizer with a liquid composition to reduce clumping caused by water absorption.

BACKGROUND

Solid fertilizers, such as urea and ammonium sulfate, provide nutrients to the soil. Many solid fertilizers are hygroscopic, which can result in stickiness, clumping, and caking when the fertilizer becomes wet. This clumping reduces the flowability of the fertilizers and complicates their handling. These complications can also arise when the solid fertilizer is stored in a humid environment or contacts water or a water-containing solution, such as fertilizer additives. Furthermore, untreated solid fertilizers may produce dust when processed, leading to decreased performance for the equipment used in processing.

Absorbent materials, such as attapulgite clay, diatomaceous earth, and urea formaldehyde polymers may be blended with granulated solid fertilizers and provide some relief from these complications. In some instances, farmers may use explosives to break apart clumped stockpiles, endangering themselves and those nearby. In other instances, removal of loose solid fertilizer leaves clumped sections of the stockpile, which form bridges prone to dangerous collapse. These approaches, thus, are inadequate for improving the flow of solid fertilizers exposed to water and/or high humidity.

SUMMARY

Briefly, therefore, one aspect of the present disclosure encompasses a method for treating a solid fertilizer. The method comprise contacting the solid fertilizer with an amount of a liquid composition effective for reducing moisture-induced clumping in the solid fertilizer, and the liquid composition may comprise one or more organic solvents and/or petroleum distillates.

In one embodiment, the organic solvents may be selected from the group consisting of:
(a) a compound comprising Formula (X)

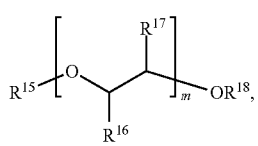

wherein $R^{15}$ is hydrogen or alkyl;
$R^{16}$ is hydrogen or alkyl;
$R^{17}$ is hydrogen, =O, or alkyl;
$R^{18}$ is hydrogen, alkyl, or acyl; and
m is 1 to 4;
wherein $R^{15}$ and $R^{16}$, or $R^{15}$ and $R^{18}$ may together form a ring comprising one or more oxygen atoms;
(b) dialkylcarbonate, comprising the Formula ROC(=O) OR', wherein R and R' are independently alkyl, optionally substituted with one or more alkyl, alkoxy, or hydroxyl; and wherein R and R' may together form a ring;
(c) $C_1$-$C_4$ alcohol;
(d) vegetable oil; and
(e) esters of dicarboxyacids comprising Formula (VIII),

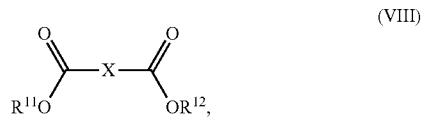

wherein X is alkylene or alkenylene; and $R^{11}$ and $R^{12}$ are independently alkyl.

In some embodiments, and without wishing to be bound by theory, the method comprises contacting the solid fertilizer with an amount of a liquid composition effective for reducing clumping in the fertilizer caused by absorption of water. In this embodiment, the liquid composition may comprise one or more selected from the group consisting of:
(a) glycol, comprising Formula (IX)

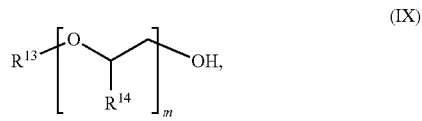

wherein $R^{13}$ is selected from the group consisting of hydrogen or alkyl;
$R^{14}$ is hydrogen or alkyl; and
m is 1 to 4;
(b) dialkylcarbonate, comprising the Formula ROC(=O) OR', wherein R and R' are independently alkyl, optionally substituted with one or more alkyl, alkoxy, or hydroxyl;
$C_1$-$C_4$ alcohol;
(d) vegetable oil;
(e) petroleum distillates;
(f) esters of hydroxyacids comprising Formula (II),

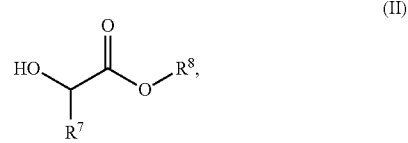

wherein $R^7$ is hydrogen or alkyl, and $R^8$ is alkyl;
(g) heterocyclic alcohols comprising Formula (III),

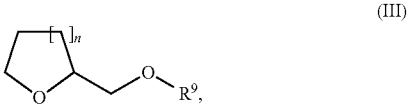

wherein n is 1 or 2; $R^9$ is selected from the group consisting of hydrogen, alkyl, and acyl; and heterocyclic alcohols of Formulae (IV), (V), and (VI):

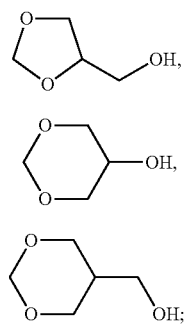

(IV)

(V)

(VI)

(h) cyclic esters of carbonic acid comprising Formula (VII),

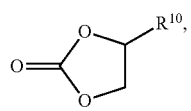

(VII)

wherein IV selected from the group consisting of hydrogen, alkyl, and hydroxyalkyl; and (i) esters of dicarboxyacids comprising Formula (VIII),

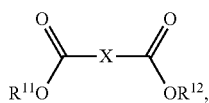

(VIII)

wherein X selected from the group consisting of alkylene and alkenylene; and $R^{11}$ and $R^{12}$ are independently alkyl.

In other embodiments, the solid fertilizer may comprise one or more of urea, ammonium sulfate, potassium sulfate, phosphorite, diammonium phosphate, potassium oxide, langbeinite, or lime. Without wishing to be bound by theory, the water may be moisture absorbed from the atmosphere, from precipitation, or from the water present in a fertilizer treatment composition.

In other aspects, the present disclosure provides a fertilizer composition, comprising 99-99.8% (w/w, of the total composition) solid fertilizer comprising one or more of urea, ammonium sulfate, potassium sulfate, phosphorite, diammonium phosphate, potassium oxide, langbeinite, or lime; 0.18-0.99% (w/w, of the total composition) propylene (glycol; and 0.01-0.1% (w/w, of the total composition) ethyl lactate.

Other features and iterations of the disclosure are described in more detail below.

DETAILED DESCRIPTION

Disclosed herein are liquid compositions comprising one or more solvents for use in treating solid fertilizers. The present disclosure also provides methods for applying these liquid compositions to the solid fertilizer. The disclosure further comprises fertilizer compositions, comprising solid fertilizer, propylene glycol, and ethyl lactate.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification the drawings, the chemical structures, and descriptions, which forms a part of this disclosure. Any description of any R-group or chemical substituent, alone or in any combination, may be used in any chemical Formula described herein, and Formulae include all conformational and stereoisomers, including diastereomers, epimers, and enantiomers. Moreover any feature of a composition disclosed herein may be used in combination with any other feature of a composition disclosed herein.

(I) Compositions

One aspect of the present disclosure encompasses a liquid composition, comprising one or more organic solvents and/or petroleum distillates. In one embodiment, the liquid composition may comprise one or more selected from the group consisting of glycol, dialkylcarbonate, $C_1$-$C_4$ alcohol, vegetable oil, petroleum distillates, esters of hydroxyacids, heterocyclic alcohols, cyclic esters of carbonic acid, and esters of dicarboxyacids. Another aspect of the disclosure provides a liquid composition, comprising a $C_1$-$C_4$ alcohol, a vegetable oil, and a surfactant. Yet another aspect of the disclosure provides a liquid composition, comprising a $C_1$-$C_4$ alcohol, a petroleum distillate, and a surfactant.

"Liquid" refers to a solution, suspension, or an emulsion that is fluid under ambient conditions. Generally, the liquid compositions are liquid (as opposed to solid) from at least about −20° C. to at least about 60° C., such as from about 0° C. to about 40° C., or from about 10° C. to about 30° C.

In some embodiments, the liquid composition may comprise dimethylcarbonate and propylene glycol. In other embodiments, the liquid composition may comprise 5-30% (w/w, of the total composition) dimethylcarbonate, 40-85% (w/w, of the total composition) propylene glycol, and 0-5% (w/w, of the total composition) dye.

In still other embodiments, the liquid composition may comprise 0.1-5% (w/w, of the total composition) dimethylcarbonate, 75-95% (w/w, of the total composition) propylene glycol, 0-10% butoxyethanol, and 0-5% (w/w, of the total composition) dye.

In yet other embodiments, the liquid composition may further comprise 5-30% (w/w, of the total composition) ethyl lactate.

In still other embodiments, the liquid composition may comprise 5-30% (w/w, of the total composition) $C_1$-$C_4$ alcohol, 20-50% (w/w, of the total composition) vegetable oil, 50-75% (w/w, of the total composition) surfactant, and 0-5% (w/w) dye.

In one embodiment, the liquid composition may comprise 1-10% (w/w, of the total composition) ethyl lactate and 90-99% (w/w, of the total composition) propylene glycol.

In one embodiment, the liquid composition may comprise 1-10% (w/w, of the total composition) ethyl lactate, 40-50% (w/w, of the total composition) propylene glycol, and 40-50% (w/w, of the total composition) water.

Another aspect of the present composition provides fertilizer composition, for example a fertilizer composition formed by mixing a liquid composition disclosed herein with one or more solid fertilizers. In some embodiments, the fertilizer composition may comprise 99-99.8% (w/w, of the total composition) solid fertilizer comprising one or more of urea, ammonium sulfate, potassium sulfate, phosphorite, diammonium phosphate, potassium oxide, langbeinite, or lime; 0.18-0.99% (w/w, of the total composition) propylene glycol; and 0.01-0.1% (w/w, of the total composition) ethyl lactate.

In an exemplary embodiment, the solid fertilizer is ammonium sulfate.

In one embodiment, clumping in the fertilizer composition caused by absorption of water is reduced compared to clumping in the solid fertilizer alone.

(a) Solvent

The liquid composition comprises at least one solvent. In some embodiments, the liquid composition may comprise one or more organic solvents and/or petroleum distillates.

In one embodiment, the solvent may be a dialkylcarbonate, such as dimethylcarbonate (DMC).

In other embodiments, the solvent may be a combination of a lower alcohol and a vegetable oil.

In still other embodiments, the solvent may be a combination of a lower alcohol and a petroleum distillate.

The liquid composition may comprise further solvents, such as a glycol or a hydroxyl acid ester, such as ethyl lactate, or an additional polar or non-polar solvent.

(i) Organic Solvents

In one embodiment, the liquid composition may comprise one or more organic solvents.

In one embodiment, the organic solvents may be selected from the group consisting of:

(a) a compound comprising Formula (X)

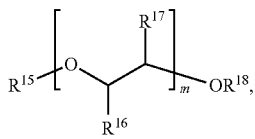

wherein $R^{15}$ is hydrogen or alkyl;
$R^{16}$ is hydrogen or alkyl;
$R^{17}$ is hydrogen, =O, or alkyl;
$R^{18}$ is hydrogen, alkyl, or acyl; and
m is 1 to 4;
wherein $R^{15}$ and $R^{16}$, or $R^{15}$ and $R^{18}$ may together form a ring comprising one or more oxygen atoms;

(b) dialkylcarbonate, comprising the Formula ROC(=O)OR', wherein R and R' are independently alkyl, optionally substituted with one or more alkyl, alkoxy, or hydroxyl; and wherein R and R' may together form a ring;

(c) $C_1$-$C_4$ alcohol;

(d) vegetable oil; and (e) esters of dicarboxyacids comprising Formula (VIII),

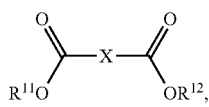

wherein X is alkylene or alkenylene; and $R^{11}$ and $R^{12}$ are independently alkyl.

In some embodiments, the organic solvent may comprise a compound comprising Formula (X)

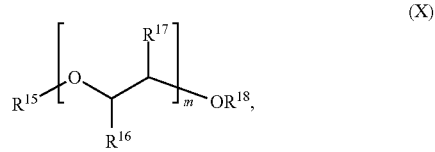

wherein $R^{15}$ is hydrogen or alkyl;
$R^{16}$ is hydrogen or alkyl;
$R^{17}$ is hydrogen, =O, or alkyl;
$R^{18}$ is hydrogen, alkyl, or acyl; and
m is 1 to 4;
wherein $R^{15}$ and $R^{16}$, or $R^{15}$ and $R^{18}$ may together form a ring comprising one or more oxygen atoms.

In some embodiments, $R^{15}$ may be hydrogen.

In other embodiments, $R^{16}$ may be methyl. In still other embodiments, m may be 1.

In particular embodiments, $R^{15}$ may be hydrogen, $R^{16}$ may be methyl, and m may be 1.

In still other embodiments, $R^{15}$ may be butyl, $R^{16}$ may be hydrogen, and m may be 1.

In some embodiments, the organic solvent may comprise a compound of Formula (X), and the compound of Formula (X) may be a glycol comprising Formula (IX),

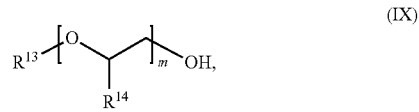

wherein $R^{13}$ is hydrogen or alkyl;
$R^{14}$ is hydrogen or alkyl; and
m is 1 to 4.

In some embodiments, $R^{13}$ may be hydrogen.

In other embodiments, $R^{14}$ may be methyl. In still other embodiments, m may be 1.

In particular embodiments, $R^{13}$ may be hydrogen, $R^{14}$ may be methyl, and m may be 1.

In still other embodiments, $R^{13}$ may be butyl, $R^{14}$ may be hydrogen, and m may be 1.

Other suitable glycols include alkylene glycols, such as methanediol, 1,2-ethanediol (ethylene glycol), 1,2-propanediol (propylene glycol), 1,3-propanediol, 1,2-butanediol 1,3-butanediol, 1,4-butanediol, and 1,5-pentanediol; or polyalkylene glycols, such as polyethylene glycol, for example di(ethylene glycol), tri(ethylene glycol), tetra(ethylene glycol), and hexa(ethylene glycol); or polypropylene glycol, for example di(propylene glycol), tri(propylene glycol), and tetra(propylene glycol). Optionally, the glycol may comprise a terminal alkoxyl group, such as methoxy, ethoxy, propoxy, or butoxy.

In exemplary embodiments, the glycol may be propylene glycol or butyoxyethanol.

The amount of glycol in the liquid composition may vary. In general, the weight percent of glycol to the total composition may range from 0% to 85% (w/w). In various embodiments, the weight percent of glycol to the total composition may be about 0%, about 5%, about 10%, about 15%, about 20%, about 25%, about 30%, about 35%, about 45%, about 50%, about 55%, about 60%, about 65%, about 70%, about 75%, about 80%, or about 85% (w/w).

In exemplary embodiments, the weight percent of glycol in the total composition may range from about 40% to about 85% (w/w).

In other exemplary embodiments, the weight percent of glycol in the total composition may range from about 50% to about 85% (w/w).

In one embodiment, the weight percent of glycol in the total composition is more than about 5% (w/w).

In one embodiment, the weight percent of glycol in the total composition is less than about 85% (w/w).

In still other exemplary embodiments, the weight percent of glycol in the total composition may range from about 75% to about 95% (w/w).

In particular embodiments, the glycol may be propylene glycol, butoxyethanol, or a mixture of propylene glycol and butoxyethanol. The amount of butoxyethanol in the liquid composition may vary. In general, the weight percent of butoxyethanol to the total composition may range from 0% to 10% (w/w).

In various embodiments, the weight percent of butoxyethanol to the total composition May be about 0%, about 1%, about 2%, about 3%, about 4%, about 5%, about 6%, about 7%, about 8%, about 9%, or about 10% (w/w).

In one embodiment, the liquid composition may comprise a compound of Formula (X), and the compound of Formula (X) is an ester of hydroxyacid comprising Formula (II),

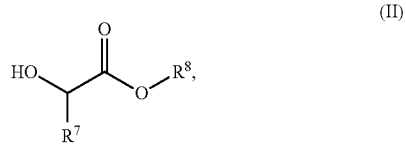

(II)

wherein $R^7$ is hydrogen or alkyl; and $R^8$ is alkyl.

In some embodiments, the ester of the hydroxyacid may be selected from the group consisting of methyl lactate, ethyl lactate, methyl glycolate, and ethyl glycolate.

In particular embodiments, the ester of the hydroxyacid may be ethyl lactate. Ethyl lactate is regarded as a "green" solvent and may be derived from renewable resources, such as corn.

In one embodiment, the liquid composition may comprise a compound of Formula (X), and the compound of Formula (X) is a heterocyclic alcohol comprising Formula (III),

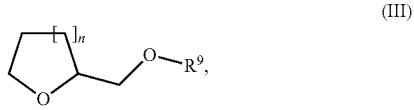

(III)

wherein n is 1 or 2; and
$R^9$ is hydrogen, alkyl, or acyl.

In one embodiment, the liquid composition may comprise a compound of Formula (X), and the compound of Formula (X) is a heterocyclic alcohol of Formulae (IV), (V), or (VI):

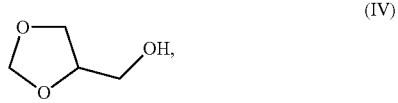

(IV)

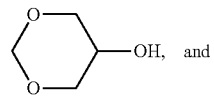

(V)

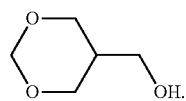

(VI)

In some embodiments, the liquid composition may comprise a dialkylcarbonate. Dialkylcarbonates comprises the Formula ROC(=O)OR', wherein R and R' are independently alkyl, optionally substituted with one or more alkyl, alkoxy, or hydroxyl; and wherein R and R' may together form a ring. In one embodiment, the dialkylcarbonate does not comprise a ring structure. In some embodiments, the alkyl selected from the group consisting of methyl, ethyl, propyl, isopropyl, n-butyl, isobutyl, sec-butyl, and tert-butyl. In other embodiments, the alkyl is optionally substituted with one or more alkyl, alkoxyl, or hydoxy groups. Examples of suitable dialkylcarbonates include dimethylcarbonate, ethylmethylcarbonate, diethylcarbonate, ethylpropylcarbonate, methylpropylcarbonate, dipropylcarbonate, butylethylcarbonate, butylpropylcarbonate, butylmethylcarbonate, and dibutylcarbonate. In exemplary embodiments, the dialkylcarbonate may be dimethylcarbonate (DMC); that is, R and R' are both methyl.

DMC presents many advantages as a solvent. As a class of solvents, dialkylcarbonates are generally considered to be green solvents and are exempted from classification as volatile organic compounds (VOCs). DMC may hydrolyze under acidic or basic conditions to methanol and carbon dioxide. Under neutral conditions with suitable buffers, DMC may remain stable indefinitely.

In one embodiment, the liquid composition comprises a dialkylcarbonate, and the dialkylcarbonate may be a cyclic ester of carbonic acid comprising Formula (VII),

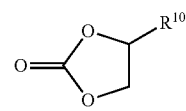

(VII)

wherein $R^{10}$ is hydrogen, alkyl, or hydroxyalkyl.

The amount of dialkylcarbonate in the liquid composition may vary. In general, the weight percent of dialkylcarbonate to the total composition may range from 0% to 30% (w/w).

In various embodiments, the weight percent of dialkylcarbonate to the total composition may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% (w/w).

In exemplary embodiments, the weight percent of dialkylcarbonate in the total composition may range from about 5% to about 30% (w/w).

In other exemplary embodiments, the weight percent of dialkylcarbonate in the total composition may range from about 0.1% to about 5% (w/w).

In one embodiment, the weight percent of dialkylcarbonate in the total composition is more than about 0.1% (w/w).

In one embodiment, the weight percent of dialkylcarbonate in the total composition is less than about 30% (w/w).

In some embodiments, the liquid composition may comprise a mixture of alcohol and vegetable oil. This system is relatively inexpensive. Also alcohols and the vegetable oils are plant-derived, green solvents attractive to farmers.

In various embodiments, the alcohol may be $C_1$-$C_4$ alcohol, such as methanol, ethanol, n-propanol, isopropanol, n-butanol, sec-butanol, isobutanol, and tert-butanol. In exemplary embodiments, the $C_1$-$C_4$ alcohol may be methanol or ethanol. The amount of alcohol in the liquid composition may vary. In general, the weight percent of alcohol to the total composition may range from 0% to 30% (w/w).

In various embodiments, the weight percent of alcohol to the total composition may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% (w/w).

In exemplary embodiments, the weight percent of alcohol in the total composition may range from about 5% to about 30% (w/w).

In one embodiment, the weight percent of alcohol in the total composition is more than about 0.1% (w/w).

In one embodiment, the weight percent of alcohol in the total composition is less than about 30% (w/w).

In some embodiments, the organic solvent comprises a vegetable oil. Suitable vegetable oils include, for example, castor oil, coconut oil, corn oil, cottonseed oil, olive oil, palm oil, peanut oil, rapeseed oil, safflower oil, sesame oil, soybean oil, sunflower oil, mustard oil, almond oil, beech oil, cashew oil, hazelnut oil, macadamia oil, mongongo oil (manketti oil), pecan oil, pine nut oil, pistachio oil, walnut oil, grapefruit seed oil, lemon oil, orange oil, bitter gourd oil, bottle gourd oil, buffalo gourd oil, butternut squash seed oil, egusi seed oil, pumpkin seed oil, watermelon seed oil, acai oil, black seed oil, blackcurrant seed oil, borage seed oil, evening primrose oil, flaxseed oil, amaranth oil, apricot oil, apple seed oil argan oil, avocado oil, babassu oil, ben oil, borneo tallow nut oil, cape chestnut oil, carod pod oil, cocoa butter, cocklebur oil, cohune oil, coriander seed oil, date seed oil, dika oil, false flax oil, grape seed oil, hemp oil, kapok seed oil, kenaf seed oil, lallemantia oil, mafura oil, marula oil, meadowfoam seed oil, niger seed oil, nutmeg butter, okra seed oil, papaya seed oil, perilla seed oil, persimmon seed oil, pequi oil, pili nut oil, pomegranate seed oil, poppyseed oil, prune kernel oil, quinoa oil, ramtil oil, rice bran oil, royle oil, sacha inchi oil, spaote oil, seje oil, shea butter, taramira oil, tea seed oil, thisle oil, tigernut oil, tobacco seed oil, tomato seed oil, and wheat germ oil.

In exemplary embodiments, the vegetable oil may be selected from the group consisting of castor oil, corn oil, peanut oil, rapeseed oil, soybean oil, and sunflower seed oil.

In exemplary embodiments, the vegetable oil may comprise one or more selected from the group consisting of castor oil, corn oil, peanut oil, rapeseed oil, soybean oil, and sunflower seed oil.

The amount of vegetable oil in the liquid composition may vary. In general, the weight percent of vegetable oil to the total composition may range from 0% to 70% (w/w).

In various embodiments, the weight percent of vegetable oil to the total composition may be about 5%, about 10%, about 15%, about 20%, about 25%, about 30%, about 35%, about 40%, about 45%, about 50%, about 55%, about 60%, about 65%, or about 70% (w/w).

In exemplary embodiments, the weight percent of vegetable oil in the total composition may range from about 40% to about 70% (w/w).

In other exemplary embodiments, the weight percent of vegetable oil in the total composition may range from about 20% to about 50% (w/w).

In one embodiment, the weight percent of vegetable oil in the total composition is more than about 5% (w/w).

In one embodiment, the weight percent of vegetable oil in the total composition is less than about 70% (w/w).

Optionally, when the vegetable oil is a solid at a temperature below 25° C., the liquid composition may further comprise a sufficient amount of petroleum distillates to keep the vegetable oil fluid. A liquid composition comprising an alcohol and a vegetable oil may also further comprise ethyl lactate and/or propylene glycol.

Esters of dicarboxyacids may comprise Formula (VIII), as shown below:

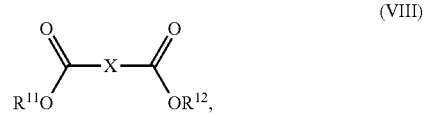

wherein X selected from the group consisting of alkylene and alkenylene, and $R^{11}$ and $A^{12}$ are independently alkyl.

The liquid composition may comprise other solvents in addition to those described above. For example, the solvent may be a polar protic solvent, a polar aprotic solvent, a nonpolar organic solvent, or combinations thereof. Non-limiting examples of suitable polar protic solvents include alcohols, such as methanol, ethanol, isopropanol, n-propanol, isobutanol, n-butanol, sec-butanol, tert-butanol, and combinations thereof. Non-limiting examples of suitable aprotic solvents include acetone, acetonitrile, diethoxymethane, N,N-dimethylformamide (DMF), dimethyl sulfoxide (DMSO), N,N-dimethylpropanamide (or dimethylpropionamide; DMP), 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMA), N-methyl-2-pyrrolidinone (NMP), 1,4-dioxane, ethyl formate, formamide, hexachloroacetone, hexamethylphosphoramide, methyl acetate, N-methylacetamide, N-methylformamide, methylene chloride, methoxyethane, morpholine, nitrobenzene, nitromethane, propionitrile, pyridine, sulfolane, tetramethylurea, tetrahydrofuran (THF), 2-methyl tetrahydrofuran, tetrahydropyran (THP), trichloromethane, and combinations thereof. Representative nonpolar solvents include, but are not limited to, alkane and substituted alkane solvents (including cycloalkanes), aromatic hydrocarbons, esters, ethers, ketones, and combinations thereof. Specific nonpolar solvents that may be employed include, for example, benzene, butyl acetate, t-butyl methylether, t-butyl methylketone, chlorobenzene, chloroform, cyclohexane, dichloromethane, dichloroethane, diethyl ether, ethyl acetate, fluorobenzene, heptane, hexanes, methyl ethylketone (2-butanone), methyl isobutyl ketone, pentyl acetate, propyl acetates, toluene, and combinations thereof.

In exemplary embodiments, the additional solvent may comprise ethyl acetate.

The amount of the additional solvent in the liquid composition may vary. In general, the weight percent of the additional solvent to the total composition may range from 0% to 85% (w/w).

In various embodiments, the weight percent of the additional solvent to the total composition may be about 0%, about 5%, about 10%, about 15%, about 20%, about 25%, about 30%, about 35%, about 45%, about 50%, about 55%, about 60%, about 65%, about 70%, about 75%, about 80%, or about 85%.

In exemplary embodiments, the weight percent of the additional solvent in the total composition may range from about 40% to about 85% (w/w).

In other exemplary embodiments, the weight percent of the additional solvent in the total composition may range from about 5% to about 50% (w/w).

In one embodiment, the weight percent of additional solvent in the total composition is more than about 5% (w/w).

In one embodiment, the weight percent of additional solvent in the total composition is less than about 85% (w/w).

(ii) Petroleum Distillates

In some embodiments, the liquid composition comprises a petroleum distillate. Suitable petroleum distillates include, for example, pentanes, hexanes, heptanes, octanes, petroleum ether (pet. ether), ligroin, light petroleum distillates, medium petroleum distillates, and heavy petroleum distillates. In some embodiments, the petroleum distillates may be hydrotreated to increase the proportion of saturation within the petroleum distillates.

The amount of petroleum distillates in the liquid composition may vary. In general, the weight percent of petroleum distillates to the total composition may range from 0% to 70% (w/w).

In various embodiments, the weight percent of petroleum distillates to the total composition may be about 5%, about 10%, about 15%, about 20%, about 25%, about 30%, about 35%, about 40%, about 45%, about 50%, about 55%, about 60%, about 65%, or about 70% (w/w).

In exemplary embodiments, the weight percent of petroleum distillates in the total composition may range from about 10% to about 30% (w/w).

In one embodiment, the weight percent of petroleum distillates in the total composition is more than about 5% (w/w).

In one embodiment, the weight percent of petroleum distillates in the total composition is less than about 70% (w/w).

(b) Solid Fertilizers

In other embodiments, the fertilizer composition may comprise one or more solid fertilizers.

In various embodiments, the liquid composition may be applied to one or more solid fertilizers.

In one embodiment, the solid fertilizer may comprise one or more of urea, ammonium sulfate, potassium sulfate, phosphorite, diammonium phosphate, potassium oxide, langbeinite, or lime.

In an exemplary embodiment, the solid fertilizer may be ammonium sulfate.

The amount of the solid fertilizer in the fertilizer composition may vary. In general, the weight percent of the solid fertilizer to the total composition may range from 90% to 99.8% (w/w).

In various embodiments, the weight percent of the solid fertilizer to the total composition may be about 90%, about 91%, about 92%, about 95%, about 96%, about 97%, about 98%, about 99%, about 99.05%, about 99.1%, about 99.15%, about 99.2%, about 99.25%, about 99.3%, about 99.3.5%, about 99.4%, about 99.45%, about 99.5%, about 99.55%, about 99.6%, about 99.65%, about 99.7%, about 99.75%, or about 99.8%.

In exemplary embodiments, the weight percent of the solid fertilizer in the total composition may range from about 99% to about 99.8% (w/w).

In one embodiment, the weight percent of solid fertilizer in the total composition is more than about 90% (w/w).

In one embodiment, the weight percent of solid fertilizer in the total composition is less than about 99.8% (w/w).

(c) Further Components

In various embodiments, the liquid composition may comprise further components, such as dyes, surfactants, polysaccharides, and calcium sources.

(i) Dyes

Optionally, the composition may further comprise a dye, pigment, pigment dispersion, lake pigment, color additive, and the like. The dye may serve at least two purposes: to show that a fertilizer has been adequately covered with a liquid composition, and to aid the user in seeing that the fertilizer has been applied to the field. In particular embodiments, the dye may be selected to show coverage of the liquid composition. In some embodiments, the dye may be an industrial grade or an FD&C grade dye. In exemplary embodiments, the dye may be a phthalo blue dye.

The amount of dye in the liquid composition may vary. In general, the weight percent of dye to the total composition may range from 0% to 5% (w/w).

In various embodiments, the weight percent of dye to the total composition may be about 1%, about 2%, about 3%, about 4%, or about 5%.

In exemplary embodiments, the weight percent of dye in the total composition may range from about 2% to about 3% (w/w).

In one embodiment, the weight percent of dye in the total composition is more than about 1% (w/w).

In one embodiment, the weight percent of dye in the total composition is less than about 5% (w/w).

(ii) Surfactants

In some embodiments, the liquid composition may comprise a surfactant, which may improve the stability of emulsions formed between other components in the liquid composition, increase wettability of the liquid composition on a solid fertilizer, or inhibit unwanted microbial growth in the liquid composition.

In various embodiments, the surfactant may be a alkylaryl polyether alcohol, such as Triton™ X-100, Surfonic™ N-100 (nonoxynol-10), Witconol™ NP-100, Tergitol™ NP-9, or Tergitol™ NP-6; or a poloxamer, such as Pluronic™, Synperonic™, or Kolliphor™. Other suitable examples of surfactants include, for example, Walwet CM, 2-acrylamido-2-methylpropane sulfonic acid, alkyl polyglycoside, ammonium perfluorononanoate, benzalkonium chloride (BAC), benzethonium chloride (BZT), 5-bromo-5-nitro-1,3-dioxane, cetyl trimethylammonium bromide (CTAB, hexadecyltrimethylammonium bromide, cetyl trimethylammonium chloride), cetylpyridinium chloride (CPC), cyclohexyl-1-hexyl-maltopyranoside, decylmaltopyranoside, decyl polyglucose, dimethyldioctadecylammonium chloride, dioctadecyldimethylammonium bromide (DODAB), dipalmitoylphosphatidylcholine, lauryldimethylamine oxide, dodecylmaltopyranoside, magnesium laureth sulfate, polyethoxylated tallow amine (POEA), octenidine dihydrochloride, octylphenoxypolyethoxyethanol (Igepal™ CA-630), octylthioglucopyranoside (OTG), ox gall, sodium nonanoyloxybenzensulfonate, sorbitan monolaurate, surfactin, and thonozonium bromide.

In some embodiments, the surfactant may be decaglyceryl monooleate, such as Caprol™ from Abitec.

In particular embodiments, the liquid composition may comprise an alcohol, a vegetable oil, and a surfactant.

In other embodiments, the liquid composition may comprise an alcohol, a petroleum distillate, and a surfactant.

The amount of surfactant in the liquid composition may vary. In general, the weight percent of surfactant to the total composition may range from 0% to 75% (w/w).

In various embodiments, the weight percent of surfactant to the total composition may be about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, or about 75% (w/w).

In exemplary embodiments, the weight percent of surfactant in the total composition may range from about 1% to about 5% (w/w).

In other exemplary embodiments, the weight percent of surfactant in the total composition may range from about 50% to about 75% (w/w).

In one embodiment, the weight percent of surfactant in the total composition is more than about 1% (w/w).

In one embodiment, the weight percent of surfactant in the total composition is less than about 75% (w/w).

(iii) Polysaccharide

Polysaccharide may be included in the liquid composition, providing increased flowability. The amount of polysaccharide in the liquid composition may vary. In general, the weight percent of polysaccharide to the total composition may range from 0% to 10% (w/w).

In various embodiments, the weight percent of polysaccharide to the total composition may be about 1%, about 2%, about 3%, about 4%, about 5%, about 6%, about 7%, about 8%, about 9%, or about 10%.

In exemplary embodiments, the weight percent of polysaccharide in the total composition may range from about 1% to about 5% (w/w).

In one embodiment, the weight percent of polysaccharide in the total composition is more than about 1% (w/w).

In one embodiment, the weight percent of polysaccharide in the total composition is less than about 10% (w/w).

(iv) Other Ingredients

Other ingredients may be included in the liquid composition, providing for example increased flowability and crop yields. Examples of other ingredients include nitrification inhibitors, calcium sources, sulfur, zinc, copper, and the like.

The amount of other ingredients, such as a calcium source, in the liquid composition may vary. In general, the weight percent of other ingredients to the total composition may range from 0% to 10% (w/w).

In various embodiments, the weight percent of other ingredients to the total composition may be about 1%, about 2%, about 3%, about 4%, about 5%, about 6%, about 7%, about 8%, about 9%, or about 10%.

In exemplary embodiments, the weight percent of other ingredients in the total composition may range from about 1% to about 5% (w/w).

In one embodiment, the weight percent of other ingredients in the total composition is more than about 1% (w/w).

In one embodiment, the weight percent of other ingredients in the total composition is less than about 10% (w/w).

(d) Forming the Composition

The liquid compositions may be formed by adding the components in any order. The components may be mixed under ambient conditions or at an elevated temperature, so long as the temperature is low enough to avoid decomposition of the constituents. The mixing may occur, for example, but stirring, blending, shaking, or rotating the constituents in a mixing device. The mixing may occur over the course of a few minutes to several hours, such as overnight.

(II) Methods of Use

The present disclosure also provides a method for treating a solid fertilizer. The method comprises contacting the solid fertilizer with a liquid composition effective for reducing clumping in the fertilizer caused by the absorption of water. The liquid composition comprises any liquid composition, for example as described above in Section (I). The water may be moisture absorbed from the atmosphere, from precipitation, or from the water present in a fertilizer treatment composition.

The liquid composition may be added to any solid fertilizer. In some embodiments, the solid fertilizer may comprise one or more of urea, ammonium sulfate, potassium sulfate, phosphorite, diammonium phosphate, potassium oxide, langbeinite, or lime. When the urea-containing fertilizer is solid, the liquid composition may be added to the mixture during or after manufacture. To blend a solid fertilizer with a liquid composition, the fertilizer is weighed and transferred into the mixing equipment. Next, the selected amount of liquid composition is applied to the fertilizer in the mixing equipment. The mixture may be well blended before introducing other fertilizer materials, allowing adequate time for uniform coverage. A dye may be included in the liquid composition to view the uniformity of coverage.

To blend a fertilizer with a liquid composition an accurate scale may be used to weigh materials. A fertilizer blender or other equipment may be used to roll or blend the urea-containing fertilizer with the liquid composition. A rotary device may tumble the solid fertilizer and allow for uniform contact with the liquid composition without spillage. Auger and paddle mixers may also be used. Exposed inner surfaces of the mixing equipment may be clean, dry, and rust-free.

The solid fertilizer may be spread across the top of the soil using a spreader truck or an airflow truck. The solid fertilizer containing the liquid composition may be used for any plants having a need for the nutrients contained within the fertilizer, including, for example, row crops, specialty crops, pastures, sod farms, turfgrass, ornamentals, and other landscape or nursery plantings. The liquid composition may be used with solid fertilizers applied to the surface during pre-plant, pre-emergence, sidedress, top-dress, broadcast, or other post-planting applications.

In particular embodiments, 95:5 propylene glycol/ethyl lactate may be applied to ammonium sulfate to reduce clumping and dust formation.

In one embodiment, a fertilizer composition may be formed by adding about 9 lb. of 95:5 propylene glycol/ethyl lactate to one ton solid fertilizer, such as ammonium sulfate.

The amount of liquid composition applied to the solid fertilizer may vary. Generally, the amount of liquid composition applied to the solid fertilizer may range from about 0.065 L/kg to about 1 L/kg, such as about 0.065 L/kg to about 0.125 L/kg, from about 0.125 L/kg to about 0.250 L/kg, from about 0.250 L/kg to about 0.375 L/kg, from about 0.375 L/kg to about 0.500 L/kg, from about 0.500 L/kg to about 0.625 L/kg, from about 0.625 L/kg to about 0.750 L/kg, from about 0.750 L/kg to about 0.875 L/kg, or from about 0.875 L/kg to about 1.000 L/kg.

In particular embodiment, the amount of liquid composition applied to the solid fertilizer is about 3 quarts to each 50 pounds of fertilizer (about 0.125 L/kg).

The amount of liquid composition applied to the solid fertilizer may also be expressed in terms of pounds (lb) liquid composition to tons solid fertilizer. Generally, the amount of liquid composition applied to the solid fertilizer may range from about 0.5 lb/ton to about 20 lb/ton, such as from about 0.5 lb/ton to about 1 lb/ton, from about 1 lb/ton to about 2 lb/ton, from about 2 lb/ton to about 3 lb/ton, from about 3 lb/ton to about 4 lb/ton, from about 4 lb/ton to about 5 lb/ton, from about 5 lb/ton to about 6 lb/ton, from about 6 lb/ton to about 7 lb/ton, from about 7 lb/ton to about 8 lb/ton, from about 8 lb/ton to about 9 lb/ton, from about 9 lb/ton to about 10 lb/ton, from about 10 lb/ton to about 11 lb/ton, from about 11 lb/ton to about 12 lb/ton, from about 12 lb/ton to about 13 lb/ton, from about 13 lb/ton to about 14 lb/ton, from about 14 lb/ton to about 15 lb/ton, from about 15 lb/ton to about 16 lb/ton, from about 16 lb/ton to about 17 lb/ton, from about 17 lb/ton to about 18 lb/ton, from about 18 lb/ton to about 19 lb/ton, or from about 19 lb/ton to about 20 lb/ton.

In particular embodiment, the amount of liquid composition applied to the solid fertilizer is about 9 pounds to each ton fertilizer (about 9 lb/ton).

In one embodiment, the amount of liquid composition applied to the solid fertilizer may be more than about 0.5 pounds to each ton fertilizer (about 0.5 lb/ton).

In one embodiment, the amount of liquid composition applied to the solid fertilizer may be less than about 20 pounds to each ton fertilizer (about 20 lb/ton).

Definitions

The compounds described herein may have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms, in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

When introducing elements of the present disclosure or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

Having described the disclosure in detail, it will be apparent that modifications and variations are possible without departing from the scope of the disclosure defined in the appended claims.

EXAMPLES

The following examples are included to demonstrate certain embodiment of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure, therefore all matter set forth is to be interpreted as illustrative and not in a limiting sense.

Example 1

Formulations Using DMC

Liquid compositions were prepared by mixing dimethylcarbonate, propylene glycol, a pigment, and, optionally, ethyl lactate or butoxyethanol. Flammable liquids have a flashpoint below 100° F., and combustible liquids have a flashpoint between 100° F. and 200° F. By keeping the ethyl lactate to 10 wt. % or less, the flashpoint for the liquid compositions was just above 200° F., so it is not categorized as combustible. This feature is particularly advantageous in view of the notorious nature of certain solid fertilizers, such as urea, being explosive. The blue pigment formulation used was WB 18151 Phthalo Blue RS supplied by Eagle Specialty (St. Louis, Mo.).

TABLE 1

List of Formulations

| Formulation | Dimethyl carbonate* | Propylene glycol | Ethyl lactate | 2-Butoxy ethanol | Pigment |
|---|---|---|---|---|---|
| 1 | 5.5% | 92% | — | — | 2.5% |
| 2 | 12.5% | 85% | — | — | 2.5% |
| 3 | 6.25% | 85% | 6.25% | — | 2.5% |
| 4 | 6.25% | 85% | — | 6.25% | 2.5% |
| 5 | — | 95% | 5% | — | — |

*All percentages are listed as w/w of the total composition.

Example 2

Formulations Using Alcohol and Surfactant

Further liquid formulations were formed by mixing alcohol with at least one surfactant and either a petroleum distillate (Sasol 210) or a vegetable oil (soybean oil). These formulations are shown below at Table 3.

TABLE 2

List of Formulations

| Formulation | MeOH | EtOH | NP-9 | NP-6 | Sasol 210 | Soybean Oil | Walwet CM |
|---|---|---|---|---|---|---|---|
| 6 | — | 6.4% | 65.2% | — | 24.3% | — | 4.1% |
| 7 | 18.2% | — | 33.1% | — | 17.0% | — | 31.7% |
| 8 | 21.3% | — | 13.5% | 29.6% | — | 22.2% | 13.4% |

Tergitol™ NP-9 is a nonylphenol polyethoxylate nonionic surfactant produced by the Dow Chemical Company with a hydrophilic-lipophilic balance (HLB) of 12.9, a pH of 6 in 1% aqueous solution, a viscosity of 243 cP at 25° C., and a density of 1.055 g/mL at 20° C. Tergitol™ NP-6 is a nonylphenol polyethoxylate nonionic surfactant produced by the Dow Chemical Company with an HLB of 10.9, pH of 7.3 in 5% aqueous solution, a density of 1.039 g/mL at 25° C. Sasol 210 is a hydrotreated light petroleum distillate with an average flashpoint of 109° C. by ASTM D 93 and an autoignition temperature of 216° C. Walwet CM is a polyethoxylene non-ionic surfactant. Formulations 7 and 8 are both considered to be flammable because of their methanol concentrations.

Example 3

Formulations Using Propylene Glycol and Ethyl Lactate

Further liquid formulations were formed from propylene glycol and, optionally, ethyl lactate. These formulations are shown below at Table 3.

TABLE 3

List of Formulations

| Formulation | Propylene Glycol | Ethyl Lactate | Water |
|---|---|---|---|
| 9 | 95% | 5% | — |
| 10 | 50% | 5% | 45% |
| 11 | 100% | — | — |

Based on the data described below, Formulation 9 performed the best. Formulation 10 was less expensive to produce, but did not perform as well as Formulation 9 under the experimental conditions.

The following protocol was used to test ammonia fertilizer caking. The fertilizer was homogenized and riffled into six samples, each comprising 3 kg. The fertilizer sample and anticaking formulation was warmed to 60-70° C. for at least 30 minutes to ensure the formulation freely flowed and that the samples were substantially free of moisture. A portion of the anticaking formulation was applied to the fertilizer sample and rotated for 30 minute to allow the formulation to coat the sample. The coated fertilizer samples were baked at 60-70° C. for another 30 minutes to evenly distribute the formulation over the sample. Each coated sample was split into three sub-samples, allowing for triplicate application of the caking tests.

Each sample was placed into a cylinder in a humidity chamber, and labeled. The chamber was closed and the humidification cycle ran: humidified for 48 hours at 75-85% elative humidity (RH) at 30° C. and then dried for 20 hours at 40° C. and humidity (<15% RH) at constant pressure of 30 psi. When the humidification cycle was complete, the samples were removed from the chamber and their cylinders and placed onto a moving screen for 10 second to sift caked and uncaked portions of the fertilizer samples. The weight portion of the sample retained on the screen after shaking was compared to the total sample, and reported as the relative caking strength in terms of percentage. The higher relative caking strength, the more severe the caking within the fertilizer sample.

Results are displayed below at Table 4:

| Formulation | Dosage | Relative Caking Strength |
| --- | --- | --- |
| 9 | 9 pounds/ton | 49.4% |
| 10 | 9 pounds/ton | 79.2% |
| 11 | 9 pounds/ton | 67.7% |

As seen above at Table 4, Formulation 9 reduced the relative caking strength to a greater degree than either Formulation 10 or 11 under the tested conditions. Formulation 10 was the second most effective in this study.

Regarding application method, a solid fertilizer, such as ammonium sulfate, may be sprayed with a liquid composition and then mixed well before storing the ammonium sulfate in bins. After storage for several weeks to a few months, the ammonium sulfate still flowed freely. The liquid formulation may be applied, for example, at the manufacturer location or at the retailer location. In either situation, the anti-clumping and flowability benefits of the applied liquid composition were observed.

For example, one railcar of ammonium sulfate was treated with Formulation 9 at an amount of 9 lbs/ton. The railcar was moved to North Dakota and the treated ammonium sulfate was stored in bin. After several weeks, the treated ammonium sulfate still flowed freely, compared to untreated ammonium sulfate, which was expected to clump under the same transportation and storage conditions. Thus, Formulation 9 reduced clumping and improved flowability of the ammonium sulfate under real life transportation and storage conditions.

What is claimed is:

1. A method for treating a solid fertilizer to reduce clumping, the method comprising:
contacting the solid fertilizer with an amount of a liquid composition effective for reducing moisture-induced clumping in the solid fertilizer,
the liquid composition comprising one or more organic solvents and/or petroleum distillates;
wherein the liquid composition comprises propylene glycol and ethyl lactate;
the solid fertilizer is mixed with the liquid composition by stirring, blending, shaking or rotating in a mixing device;
the liquid composition and solid fertilizer are present in amounts of about 0.065 L/kg to about 1 L/kg; and
the mixing occurs for at least a plurality of minutes.

2. The method of claim 1, wherein the amount of liquid composition is from about 0.5 pounds to 20 pounds of liquid composition per 1 ton of solid fertilizer.

3. The method of claim 2, wherein the amount of liquid composition is from about 4.5 pounds to 18 pounds of liquid composition per 1 ton of solid fertilizer.

4. The method of claim 3, wherein the amount of liquid composition is 9 pounds of liquid composition per 1 ton of solid fertilizer.

5. The method of claim 1, wherein the liquid composition further comprises dimethylcarbonate.

6. The method of claim 5, wherein the liquid composition comprises:
0-5% (w/w, of the total composition) dimethylcarbonate;
75-95% (w/w, of the total composition) propylene glycol;
0-10% (w/w, of the total composition) butoxyethanol; and
0-5% (w/w, of the total composition) dye; and
5-30% (w/w, of the total composition) ethyl lactate.

7. The method of claim 1, wherein the liquid composition further comprises a surfactant.

8. The method of claim 7, where the surfactant is a nonylphenol polyethoxylate.

9. The method of claim 1, wherein the solid fertilizer comprises one or more of urea, ammonium sulfate, potassium sulfate, phosphorite, diammonium phosphate, potassium oxide, langbeinite, or lime.

10. The method of claim 1, wherein the liquid composition comprises:
90-99% (w/w, of the total composition) propylene glycol; and
1-10% (w/w, of the total composition) ethyl lactate.

11. The method of claim 1, wherein the liquid composition further comprises a vegetable oil is selected from the group consisting of castor oil, corn oil, peanut oil, rapeseed oil, soybean oil, and sunflower seed oil.

12. The method of claim 1, wherein the mixing occurs at an elevated temperature of at least about 60° C.

13. A method for treating a solid fertilizer, the method comprising:
contacting the solid fertilizer with an amount of a liquid composition effective for reducing moisture-induced clumping in the solid fertilizer,
the liquid composition comprising one or more organic solvents and/or petroleum distillates;
wherein the liquid composition comprises:
5-30% (w/w, of the total composition) $C_1$-$C_4$ alcohol;
20-50% (w/w, of the total composition) vegetable oil;
50-75% (w/w, of the total composition) surfactant; and
0-5% (w/w, of the total composition) dye.

14. A fertilizer composition comprising:
99-99.8% (w/w, of the total composition) solid fertilizer comprising one or more of urea, ammonium sulfate, potassium sulfate, phosphorite, diammonium phosphate, potassium oxide, langbeinite, or lime;

0.18-0.99% (w/w, of the total composition) propylene glycol; and 0.01-0.1% (w/w, of the total composition) ethyl lactate.

15. The fertilizer composition of claim 14, wherein the solid fertilizer comprises ammonium sulfate.

16. The fertilizer composition of claim 14, wherein moisture-induced clumping in the fertilizer composition is reduced compared to moisture-induced clumping in the solid fertilizer alone.

\* \* \* \* \*